Nov. 10, 1959   G. W. FEIL, JR   2,912,198
MOTOR VEHICLE EXHAUST MUFFLER SUPPORT MEANS
Filed Aug. 19, 1955
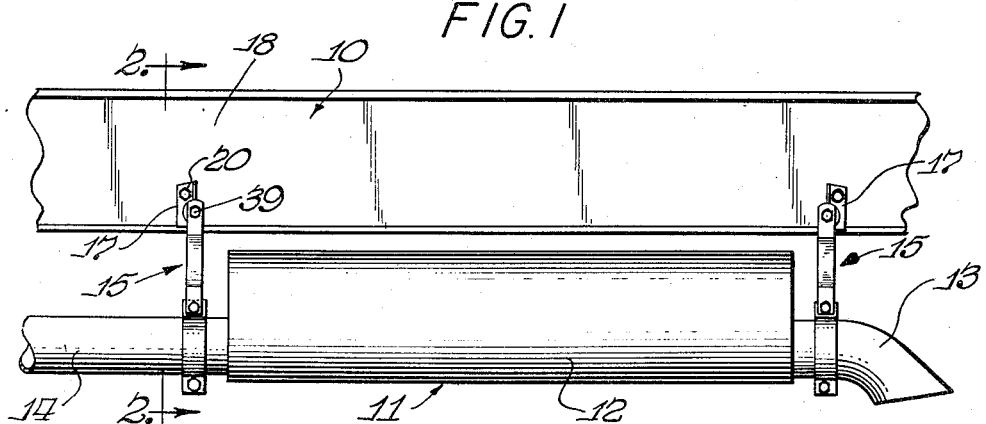
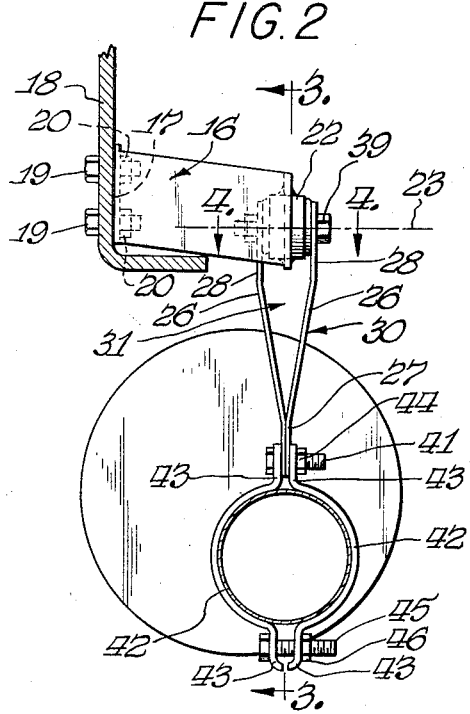
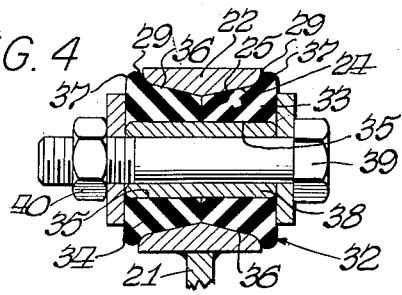
INVENTOR
GEORGE W. FEIL Jr.
Paul O. Pippel
ATTORNEY

United States Patent Office 2,912,198
Patented Nov. 10, 1959

2,912,198

MOTOR VEHICLE EXHAUST MUFFLER SUPPORT MEANS

George W. Feil, Jr., Fort Wayne, Ind., assignor to International Harvester Company, a corporation of New Jersey Application August 19, 1955, Serial No. 529,499

4 Claims. (Cl. 248—54)

This invention relates to motor vehicles adapted to derive propulsion power from internal combustion engines and more particularly to a unique supporting means for an internal combustion engine muffler for such a vehicle.

Because of the unbalance of moving parts, unequal power impulses, combustion roughness and engine torque reactions, reciprocating piston type motor vehicle internal combustion engines are subjected to vibratory forces tending to oscillate the engines when operating. Thus, in most installations the engine is mounted on the vehicle chassis frame in such a manner that it is free to oscillate relatively to the frame in all directions to prevent the transmission of such vibratory forces to the chassis frame. The mounting means employed generally offer a resilient restraint against excessive relative movement between the chassis frame and engine and cushion the vibratory forces. An exhaust pipe which extends from the engine to a point where it is desirous of expelling exhaust gases to the atmosphere includes a muffler and since one end of the exhaust pipe is rigidly connected to the exhaust manifold of the engine, it is obvious that the oscillating movement of the engine is transmitted to the exhaust pipe including the muffler tending to move it relatively to the frame. Furthermore, as the engine as well as the exhaust pipe is heated and cooled periodically as when the engine is in operation and when stopped the exhaust pipe tends to expand and contract longitudinally in accordance with such changes of temperature with respect to the chassis frame. Difficulty has also been experienced in the past in providing supporting means for the exhaust pipe of a motor vehicle which will function to insulate the exhaust pipe so that the exhaust noises therein will not be transmitted to the vehicle frame. It is, therefore, an important object of the present invention to provide a relatively simple and inexpensive but sturdy supporting means for mounting the muffler on the chassis frame which will positively secure the muffler in assembled relation with the frame and insure against accidental disengagement of the muffler from the frame but which will permit the muffler to move longitudinally with respect to the frame to compensate for changes in temperature thereof and to a limited degree in a transverse direction to permit relatively free movement of the muffler with respect to the frame due to oscillation of the engine when operating.

Another object of the invention is to provide means for connecting the muffler to the chassis frame which connections are effective to insulate the muffler from metallic contact with the frame whereby the noises developed within the muffler are prevented from being transmitted to the frame.

Another object of the present invention is to provide an improved flexible mounting for the muffler of a resiliently mounted vehicle engine which permits the muffler and pipes communicating therewith to move freely in unison with the engine with respect to the chassis frame.

A still further object is the provision of a flexible supporting means for an engine exhaust muffler which will flex sufficiently to permit the muffler and exhaust pipe to move longitudinally with respect to the chassis frame upon changes in temperatures thereof as well as to permit limited flexibility in a transverse direction whereby the engine and exhaust muffler can oscillate transversely with respect to the chassis frame, which means also acts as a sound insulator whereby the exhaust noises developed within the exhaust muffler are not transmitted to the chassis frame.

Still another object is to provide unique and novel means for mounting the muffler upon the vehicle frame which means affords sufficient flexibility in all directions to permit relatively free displacement of the muffler with respect to the frame and at the same time positively connecting the muffler to the vehicle so as to prevent any possibility of the muffler becoming detached from the frame even though the flexible means should fail.

The foregoing and other important objects and desirable features inherent in and encompassed by the invention, together with many of the purposes and uses thereof, will become readily apparent from a reading of the ensuing description in conjunction with the annexed drawings, in which:

Figure 1 is a fragmentary side elevational view of a muffler mounted by the improved mount on a side sill member of a motor vehicle chassis frame;

Figure 2 is a sectional view taken substantially along line 2—2 of Figure 1;

Figure 3 is a sectional view taken substantially along line 3—3 of Figure 2; and Figure 4 is a sectional view taken substantially along line 4—4 of Figure 2.

Referring to the drawings in detail wherein like reference characters represent like elements throughout the various views, there is shown a portion of a longitudinal side sill member 10 of a motor vehicle frame. Disposed generally below the side sill member 10 is an engine exhaust assembly designated in its entirety by numeral 11. The engine exhaust assembly includes a sound-absorbing muffler or silencer 12 operatively connected at its rear or discharge end to a tail pipe 13. The forward or inlet end of the muffler 12 is similarly operatively connected to one end of a manifold exhaust pipe 14 which has its opposite end rigidly connected to the engine exhaust manifold (not shown).

The vehicle power plant or engine (not shown) is supported on a vehicle frame in a conventional manner wherein limited oscillating or rocking movement of the engine with respect to the side sill member 10 is permitted to compensate for the vibratory forces developed by the engine when operated. It will be appreciated that since the exhaust assembly 11 is rigidly connected to the engine the rocking movement of the engine is imparted thereto. Furthermore, the exhaust assembly 11 is subjected to the heat of the exhaust gases flowing therethrough as well as atmospheric conditions and, as a result, either elongates or contracts with respect to the chassis frame. Thus the mounting means, to be described hereinafter in detail, for the exhaust assembly 11 are designed to permit relatively unrestrained displacement of the assembly 11 in a transverse direction with respect to the chassis frame to compensate for the rocking movement of the engine, as well as lengthening and shortening of the assembly in a longitudinal direction with respect to the chassis frame to accommodate elongation or contraction due to the differences in temperature between the chassis frame and the exhaust assembly 11 without subjecting the assembly 11 to damaging stresses and strains.

Two support hangers designated generally by numeral 15 are employed to interconnect the chassis frame and the exhaust assembly 11 and are adapted to suspend the assembly 11 from the side sill member 10 and maintain the same in an operative position. The support hangers 15 are designed to accommodate the aforementioned relative movement between the exhaust assembly 11 and the side sill member 10. In the embodiment of the invention shown in Figure 1 the hangers 15 are identical in construction, one of which is shown in detail in Figure 2. Each support hanger 15 includes a C-shaped bracket 16 having one leg 17 thereof secured to the web 18 of side sill member 10 by means of a plurality of bolts 19 and cooperating lock nuts 20. The bracket 16 extends transversely inwardly with respect to the side sill member 10, and the terminal end thereof is defined by a leg 21 disposed in a plane substantially parallel to the web 18. A sleeve-like bearing member 22 extends through the leg 21 so as to have portions thereof on each side of the leg 21 and is rigidly secured thereto by any suitable means such as welding. The axis 23 of bearing member 22 extends transversely and is disposed substantially perpendicular to a vertical plane containing the web 18. The bore 24 of the bearing member 22 is in the form of a pair of frustums of cones arranged with the small ends of the frustums back to back and is defined by an inner surface 25. Thus the inner diameter of the bearing member 22 varies from a maximum at the ends thereof to a minimum in a plane intersecting the axis 23 at right angles and spaced axially substantially midway between the ends of the bearing member 22.

Each support hanger 15 further includes a pair of straps 26, arranged back to back, with a normally lower end 27 of each strap abutting the lower end of the other strap. The straps 26 extend upwardly and divergingly whereby the uppermost ends 28 are parallel and transversely spaced with respect to each other. The uppermost end 28 of each strap 26 is adapted to lie closely adjacent a respective end face 29 of the bearing member 22. In effect the straps 26, when assembled together, define a link 30 which is bifurcated at its upper end to form a yoke 31.

A resilient non-metallic busing, designated generally by numeral 32, and made preferably of rubber material, is inserted within the bore 24 of the bearing member 22. The bushing 32 includes a pair of bushing sections 33—34, each of which has an inner cylindrical surface 35 and an outer frusto-conical surface 36. When in assembled relation the bushing sections 33—34 are in such position that their smaller ends abut each other at substantially midway between the ends of the bore 24 and the outer frusto-conical surfaces 36 of each section 33—34 engage the inner surface 25 of the bearing member 22 snugly. The outer end of each bearing section 33—34 is defined by an annular end flange 37 which is adapted to radially overlap a respective end face 29 of the bearing member 22. A metallic sleeve 38 extends through the bushing 32 and engages the inner cylindrical surfaces 35 throughout their length. The sleeve 38 is of a length equal to the desired final distance between the yoke ends 28 and is somewhat shorter in length than the length of the bushing 32 in its unassembled or relaxed state. In assembly the link 30 is positioned so that the yoke portion 31, thereof, embraces the bearing member 22 and the rubber bushing 32. Preferably, the free ends 28 of the yoke 31 are originally spaced somewhat further apart than in the assembled position shown in Figure 2. The upper ends 28 of the yoke 31 are provided with openings which are registerable with the sleeve 38. A bolt 39 extends through the openings in the yoke 31 and the sleeve 38 and a lock nut 40 is threaded on the bolt end 39. By screwing the lock nut 40 on the bolt 39 tightly the upper ends 28 of the yoke 31 are urged into contact with the respective opposite ends of the sleeve 38. Because of the frusto-conical nature of the engaging surfaces of the bushing 32 and the bearing member 22, the axial force urging the upper ends 28 of the yoke 31 toward each other by drawing up the lock nut 40 causes the bushing 32 to be tightly wedged into frictional engagement with the inner surface 25 of the bearing member 22, which results in a substantially non-slipping bond between the bushing 32, bearing member 22 and the sleeve 38. Similarly, the end flanges 37 of the bushing 32 are compressed between a respective upper end 28 of the yoke member 31 and an adjacent end face 29 of the bearing member 22.

From the foregoing it will be seen that a connection between the vehicle chassis frame and the link 30 is provided which functions similarly to a universal joint, since the link 30 is capable of rocking about the axis 23 of the bearing member with respect to the chassis frame, as well as moving angularly with respect thereto about an axis intersecting and perpendicular to axis 23. Relative rocking movement between the link 30 and the bearing member 22 is accommodated by torsional flexing of the bushing 32, whereas angular movement of the link 30 with respect to the bearing member 22 about an axis perpendicular to axis 23 is afforded by compression of the rubber bushing 32. Furthermore, such relative movement between link 30 and the chassis frame is accomplished without any slipping of any surface upon the other, and thus substantially all wear between the relatively movable parts is eliminated. Furthermore, since the bushing 32 is initially under compression when assembled, as shown in Figure 4, it exerts a sufficient pressure upon the sleeve 38, upper ends 28 of the yoke 31 and the bearing member 22 to prevent excessive rattling of these parts after long periods of use. It will also be apparent that because of the frusto-conical nature of the mating surfaces of the bushing 32 and the bearing member 22, the forces of compression applied to the bushing 32 to distort the same when the link 30 moves angularly with respect to the bearing member 22 about a horizontal axis perpendicular to axis 23 are directed normally to the surfaces 36 of the bushing 32 and consequently there will not be an appreciable distortion of the bushing 32 as in the case of installations employing flexible bushings having cylindrical inner and outer surfaces. It will also be appreciated that the rubber bushing 32 is effective to insulate the link 30 from metallic contact with the bearing member 22 whereby any noises developed within the muffler and which are transmitted to the link 30 are prevented from being transmitted to the frame.

The abutting lower ends 27 of the straps 26 are provided with aligned apertures through which a pivot pin in the form of a bolt 41 extends. It will be noted that the axis of the bolt 41 is substantially parallel to the axis 23 of the bearing member 22. A pair of semicylindrical clamping elements 42 are provided which substantially encircle a respective cylindrical end of the muffler 12. The ends 43 of each clamping element 42 are bent radially outwardly and one end 43 of each clamping element 42 is adapted to abut the lower ends 27 of the straps 26. The ends 43 are provided with apertures and the bolt 41 is adapted to extend through the apertures of the clamping element ends 43 abutting the lower ends 27 of the straps 26. A nut 44 is threaded on the bolt 41 to maintain the clamping elements 42 assembled on the lower end of the link 30, as shown in Figure 2, but which permits the clamping elements 42 to pivot with respect to the link 30 about the axis of bolt 41. A clamping bolt 45 and nut 46 are provided for forcing the clamping element ends 43 associated therewith toward each other to firmly grip the muffler end. It will be appreciated that since the muffler 12 is supported by a pair of support hangers 15, which are substantially the same size and identical in construction, the muffler assembly 11 is permitted to move longitudinally with respect to the chassis frame, which movement is accommodated by simultaneous relative movement of each link 30 with respect to its associated bearing member 22 and clamping elements 42. Furthermore, the muffler assembly 11 is capable of moving angularly about a longitudinally extending axis perpendicular to the axes of the bearing members 22 by compressional distortion of the rubber bushings 32.

From the foregoing it will be appreciated that the support hanger provides an improved means for mounting a muffler assembly upon a chassis frame which allows the muffler assembly to move freely both longitudinally and transversely of the vehicle but which affords the stability to withstand the severe usage to which such an assembly is exposed.

The embodiment of the invention chosen for the purposes of description and illustration herein is that preferred for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude but rather to suggest such other modifications and adaptations of the invention as fall within the spirit and scope of the invention as defined in the appended claims.

What is claimed is:

1. A motor vehicle muffler support hanger including a U-shaped bracket adapted to be secured to the motor vehicle chassis frame and having a transversely extending sleeve-like bearing member secured to one leg of said bracket, a pair of elongated straps arranged back to back, each strap having one end portion abutting a respective end portion of the other strap and its opposite end portion spaced from the opposite end portion of the other of said straps to form a yoke, said spaced end portions being disposed adjacent respective opposite end faces of said bearing member, a transversely extending pin carried by said spaced end portions extending through said bearing member, rubber bushing means encircling said pin within said bearing member and frictionally engaging said pin and the inner wall surface of said bearing member, the ends of said bushing means extending beyond the respective opposite ends of said bearing member and frictionally engaging the spaced end portions of said yoke and the end faces of said bearing member, and clamping means adapted to embrace a muffler end section including a pair of semi-cylindrical clamping elements having oppositely directed radially extending end tabs, and the end tab of each of said clamping elements adapted to abut the outer face of the abutting end portion of a respective strap, said clamping means further including detachable means for pivotally connecting said end tabs abutting said end portions of said yoke for pivotal movement about an axis spaced below and parallel to the axis of said pin.

2. In a motor vehicle substantially as set forth in claim 1, in which, the interior wall surface of said bearing element is in the form of a pair of frusto-conical surfaces arranged so that the internal diameter of said bearing element varies gradually from a maximum at the ends thereof to a minimum substantially midway between the ends thereof, and said bushing means includes a pair of bushing sections, each of said bushing sections having an outer frusto-conical surface adapted to abut a portion of the interior surface of said bearing element.

3. A motor vehicle muffler support hanger including a bracket adapted to be secured to the motor vehicle frame and having a transversely extending sleeve-like bearing element fixed thereto, a pair of elongated straps arranged back to back, each strap having one end portion abutting a respective end portion of the other strap and its opposite end portion spaced from the respective end portion of the other strap to form a yoke, said spaced end portion being disposed adjacent to respective opposite end faces of said bearing element, a bolt carried by said spaced end portions extending through said bearing element, a spacing sleeve carried on said bolt disposed within said bearing element, rubber bushing means encircling said bolt within said bearing element and frictionally engaging said spacing sleeve and said bearing element, the ends of said bushing means extending beyond the respective opposite ends of said bearing element, means cooperating with said bolt for clamping said ends of said bushing means between said spaced end portions of said yoke and the end faces of said bearing element, and detachable clamping means adapted to embrace the end section of a muffler, said clamping means including a pair of semi-cylindrical clamping elements having oppositely directed, radially extending end tabs, an end tab of each of said clamping elements adapted to abut the outer face of the abutting end portions of a respective strap, said detachable clamping means further including means for pivotally connecting said end tabs abutting said end portions of said straps whereby said yoke is capable of pivoting about an axis parallel to the longitudinal axis of said bolt.

4. In a motor vehicle substantially as set forth in claim 3, in which, the interior surface of said bearing element is defined by a pair of frusto-conical surfaces arranged so that the internal diameter of said bearing element varies from a maximum at the ends thereof to a minimum substantially midway between the ends thereof, and said bushing means includes a pair of bushing sections, each of said bushing sections having an outer frusto-conical surface adapted to abut substantially one-half of the interior surface of said bearing element.

References Cited in the file of this patent
UNITED STATES PATENTS

| | | |
|---|---|---|
| 2,076,046 | Schjolin | Apr. 6, 1937 |
| 2,112,914 | Leighton | Apr. 5, 1938 |
| 2,160,808 | Bradley | June 6, 1939 |
| 2,267,431 | Steensen | Dec. 23, 1941 |
| 2,568,149 | Grabe | Sept. 18, 1951 |
| 2,660,449 | MacPherson | Nov. 24, 1953 |
| 2,744,706 | Gerdy | May 8, 1956 |